(12) United States Patent
Filipiak et al.

(10) Patent No.: US 11,443,022 B2
(45) Date of Patent: Sep. 13, 2022

(54) METHOD FOR CONTROLLING ACCESS TO A SECURITY MODULE

(71) Applicant: Orange, Paris (FR)

(72) Inventors: Alicia Filipiak, Châtillon (FR); Saïd Gharout, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 117 days.

(21) Appl. No.: 16/626,167

(22) PCT Filed: Jun. 22, 2018

(86) PCT No.: PCT/FR2018/051525
§ 371 (c)(1),
(2) Date: Dec. 23, 2019

(87) PCT Pub. No.: WO2019/002733
PCT Pub. Date: Jan. 3, 2019

(65) Prior Publication Data
US 2020/0151312 A1 May 14, 2020

(30) Foreign Application Priority Data
Jun. 26, 2017 (FR) ...................................... 1755844

(51) Int. Cl.
*G06F 21/33* (2013.01)
*G06F 21/60* (2013.01)

(52) U.S. Cl.
CPC .......... *G06F 21/335* (2013.01); *G06F 21/604* (2013.01)

(58) Field of Classification Search
CPC .............................. G06F 21/335; G06F 21/604
(Continued)

(56) References Cited

U.S. PATENT DOCUMENTS

2009/0202078 A1   8/2009  Bar-El et al.
2014/0298484 A1*  10/2014 Sung .................. G06F 21/6245
                                                             726/27
(Continued)

OTHER PUBLICATIONS

International Search Report and Written Opinion dated Sep. 6, 2018 for Application No. PCT/FR2018/051525.
(Continued)

*Primary Examiner* — Jacob Lipman
(74) *Attorney, Agent, or Firm* — Knobbe, Martens, Olson & Bear, LLP

(57) ABSTRACT

A method for controlling access to a security module [of a mobile terminal by an application of the mobile terminal is described. The method includes sending by a current application of the mobile terminal a request to access the security module, said access request comprising the current identifier of an applet comprised in the security module. The operating system of the mobile terminal reads a look-up table comprising a set of access control rules, an access control rule comprising the identifier of an applet of the security module associated with a control value for an application of the mobile terminal, said access control rule indicating that said application of the mobile terminal is authorized to communicate with the applet of the security module. A current control value is obtained for the current application from at least one certificate of a developer of the current application and an identifier of the current application, associated with the current application, and the look-up table is searched for an access control rule comprising the current identifier of the applet associated with the current control value, the current application being authorized to communicate with the current applet when the search is positive.

8 Claims, 1 Drawing Sheet

(58) Field of Classification Search
USPC .............................................................. 726/1
See application file for complete search history.

(56) References Cited

U.S. PATENT DOCUMENTS

2015/0134540 A1* 5/2015 Law ....................... G06Q 20/02
705/72
2016/0086159 A1* 3/2016 Golla ..................... H04W 4/60
705/76
2016/0358172 A1* 12/2016 Ziat ................... G06Q 20/3227

OTHER PUBLICATIONS

Besson, et al., "SawjaCard: A Static Analysis Tool for Certifying Java Card Applications", 2014, Network and Parallel Computing; [Lecture Notes in Computer Science; Lect.Notes Computer], Springer International Publishing, Cham, pp. 51-67.

* cited by examiner

METHOD FOR CONTROLLING ACCESS TO A SECURITY MODULE

RELATED APPLICATIONS

This application is the U.S. National Phase of Application No. PCT/FR2018/051525 entitled "METHOD FOR CONTROLLING ACCESS TO A SECURITY MODULE" and filed Jun. 22, 2018, which claims the benefit of French Patent Application No. 1755844, filed Jun. 26, 2017, each of which is incorporated by reference in its entirety.

The present invention relates to a method for controlling access of an application of a mobile terminal to a security module contained in the terminal.

It is applied to particular benefit in the execution of sensitive services, such as for example mobile payment services for which executing sensitive operations requires the controlling of access, from the operating system of the mobile terminal that is executing an application of the mobile terminal, to applications contained in the security module and commonly called "applets". The application contained in the mobile terminal calls applets of the security module in order to perform certain security operations, such as for example a cryptographic signature operation, a PIN (for "personal identification number") code verification operation, etc.

The communication between an application of the mobile terminal and the security module is defined by way of an interface called Open Mobile API, defined by an industrial consortium called SIMAlliance; the Open Mobile API interface is maintained by the GlobalPlatform association. This interface makes it possible to determine whether an application of the mobile terminal is authorized to access the security module, more precisely to dialog with an applet of the mobile terminal, and to guarantee that access to a functionality of the security module is limited to what is necessary for the application to operate correctly. The access control scheme supported by the OpenMobile API interface has for its part been specified by the GlobalPlatform association. The access control defined by GlobalPlatform hinges on a known and standardized standard, called PKCS #15 ("Public Key Cryptography Standards"), which allows users of cryptographic peripherals that contain cryptographic keys to identify themselves to applications, independently of the implementation of the interface of the cryptographic peripheral. GlobalPlatform also defines all of the rules present on the security module that determine what an application has the right or does not have the right to ask the security module. For example, a rule may stipulate that an application X, present on the mobile terminal, is authorized to interact with an applet Y, present on the security module, identified by a standardized applet identifier denoted by "AID" (for "Application Identifier"), and present in the security module. The applet identifier AID makes it possible to uniquely identify the applet provider and this applet to this provider.

The Open Mobile API or "OMAPI" interface describes an interface for communication between an application of the mobile terminal and an applet of the security module. This interface is independent of the operating system of the mobile terminal. A mobile application installed on the mobile terminal interrogates an applet contained in the security module via the OMAPI interface. To this end, the security module stores a correspondence table defined by the entity that issued the security module, for example a network operator or an administrator of the module, and that comprises a set of rules that associates an applet identifier of the security module with a check value that makes it possible to verify that an application of the mobile terminal is authorized to interact with the applet. This correspondence table is recovered on the mobile terminal by the OMAPI interface, which consults it upon each request to access the security module issued by an application. The correspondence table that contains the access control rules may also be recovered by interrogating an applet in the security module called "ARA-M" (for "Access Rule Application Master"), specified by GlobalPlatform. It is therefore at this interface where the check on the identity and the access right of the application is performed.

The check value that makes it possible to check that an application of the mobile terminal is authorized to access the security module comprises the result of a hash function applied to a value provided by the developer of the application. At present, the developer provides, as a value, either a digital fingerprint (or "hash") of its own developer certificate, that is to say of all of the fields that form its certificate, or a digital fingerprint of the certificate of the application. The access control then consists in verifying that the check value that is present in the correspondence table is equal to a current check value calculated from information associated with the application that is running and that wishes to communicate with the security module. It should be noted that the access control mechanisms may make do with verifying a digital fingerprint, as the certificate from which the fingerprint has been calculated has already been verified by the operating system when the application was installed; its integrity is therefore guaranteed.

In the first case in which the developer provides the fingerprint of its own developer certificate, if several applications developed by the same developer are installed on the mobile terminal, then the authorizations to access the security module are shared by all of the applications in question, even though some of these applications may not have any need to access the security module. This constitutes a vulnerability that may create a security flaw. Specifically, an operator or a service provider could, in some cases, subcontract the development of its applications to third parties. Ultimately, the various applications are signed or validated using the same developer certificate, in this case that of the operator or of the service provider. It is therefore not ruled out that some of the applications developed by third parties deviate from their normal operation and attempt, intentionally or erroneously, to dialog with applets of the security module, when this has not been initially specified.

In the second case in which the field that identifies an application corresponds to the digital fingerprint of the certificate of the application, then each modification of the application requires the operator to remotely update the correspondence table present in the security module. Specifically, updating an application, such as a version change, leads to the generation of a new certificate associated with the application and therefore a modification of the digital fingerprint of the certificate. The remote updating of security modules by the operator is however an expensive operation that should be limited, especially if the number of modules to be updated is high.

One of the aims of the invention is to rectify inadequacies/drawbacks of the prior art and/or to make improvements thereto.

To this end, the invention proposes a method for controlling access to a security module of a mobile terminal by an application of the mobile terminal, said method comprising:

sending, by a current application of the mobile terminal, of an access request to the security module, said access request comprising the current identifier of an applet contained in the security module, reading, by the operating system of the mobile terminal, of a correspondence table comprising a set of access control rules, an access control rule comprising the identifier of an applet of the security module associated with a check value for an application of the mobile terminal, said access control rule indicating that said application of the mobile terminal is authorized to communicate with the applet of the security module, obtaining a current check value for the current application from at least one certificate of a developer of the current application and from an identifier of the current application that are associated with the current application, searching in the correspondence table for an access control rule comprising the current identifier of the applet associated with the current check value, the current application being authorized to communicate with the current applet when the search is positive.

By associating a check value for an application obtained from the certificate of the developer of the application and from the identifier of the application with the identifier of an applet of the security module, what the application of the mobile terminal is able to ask the security module is strictly and rigorously limited. Specifically, the check value of the application of the mobile terminal, which depends on the developer, is also specific to the application due to its dependence on a unique identifier of the application. Thus, even if a developer provides a plurality of applications to the mobile terminal, the way in which the check value associated with the application is obtained makes it possible to distinguish the various applications developed by this developer. An application that does not need to access the security module is thus not granted a right to access the security module on account of the developer at the origin thereof. Moreover, even if a malicious developer manages to forge the identifier of an application authorized to communicate with the security module, the dependence of the check value on the certificate of the developer will not allow the application developed by this developer to communicate with the security module.

Moreover, using an identifier of the application in the check value, which makes it possible to limit access to the security module to just this application, guarantees a certain continuity of the entry in the correspondence table upon a change of version of the application on the mobile terminal. Specifically, when a new version of the application is loaded on the mobile terminal, it is not necessary to update the entry in the correspondence table in the security module since, even though the code of the application of the mobile terminal has been updated, the identifier of the application has remained the same. This avoids expensive procedures of remotely updating the security module when the check value is dependent on the certificate on the application, a new certificate being reissued for the application upon each change of version of this application. This is all the more true the higher the number of security modules to be updated.

In a first exemplary embodiment, the current check value is obtained by concatenating a digital fingerprint of the certificate of the developer of the current application and the identifier of the current application.

In this exemplary embodiment, memory space is optimized. Specifically, the space in the correspondence table dedicated to storing the check value is limited, which may require shortening the check value. Such shortening is performed to the detriment of security. Specifically, the risk of two check values of two different applications being the same cannot be ruled out.

In a second exemplary embodiment, the current check value comprises a digital fingerprint of the certificate of the developer of the current application in a first field and the identifier of the current application in a second field.

In this exemplary embodiment, which corresponds to another implementation choice for the correspondence table, security is optimized. Specifically, the risk of obtaining two identical entries in the correspondence table for two different applications is reduced to a minimum.

In another exemplary embodiment, the current check value is obtained from a digital signature of the certificate of the developer of the current application and from the identifier of the current application.

In this example, the check value, which is obtained from the signature of the certificate of the developer of the current application and from the identifier of the current application, bolsters security in that the check value incorporates the link between the Certification Authority and the developer. It should be noted that the operating system implements a verification of the application, i.e. of the signature of the certificate, by way of the public key of the Certification Authority that issued the certificate, when it is installed on the mobile terminal. Of course, in the case of self-signed certificates, the Certification Authority is the developer.

In one exemplary embodiment, the correspondence table is a data structure in accordance with the PKCS #15 format.

The correspondence table is an entry in the PKCS #15 file of the mobile terminal. PKCS #15 is a standard approved format used for transferring sensitive data between an application and a security module peripheral. The correspondence table is thus suitable for any type of mobile terminal.

The invention also relates to a mobile terminal comprising an application able to ask to communicate with an applet of a security module of the mobile terminal, said mobile terminal comprising:

sending means, designed so that a current application of the mobile terminal sends an access request to the security module, said access request comprising the current identifier of an applet contained in the security module, reading means, designed so that the operating system of the mobile terminal reads a correspondence table comprising a set of access control rules, an access control rule comprising the identifier of an applet of the security module associated with a check value for an application of the mobile terminal, said access control rule indicating that said application of the mobile terminal is authorized to communicate with the applet of the security module, obtainment means, designed to obtain a current check value for the current application from at least one certificate of a developer of the current application and from an identifier of the current application that are associated with the current application, searching means, designed to search in the correspondence table for an access control rule comprising the current identifier of the applet associated with the current check value, the current application being authorized to communicate with the current applet when the search is positive.

The invention also relates to a computer program on a data medium and able to be loaded into the memory of a mobile terminal, the program comprising code portions for executing the steps of the access control method described above when the program is executed on said mobile terminal.

The invention also relates to a data medium on which the above program is recorded.

Other features and advantages of the present invention will be better understood from the description and the appended drawings, in which.

Figure 1:
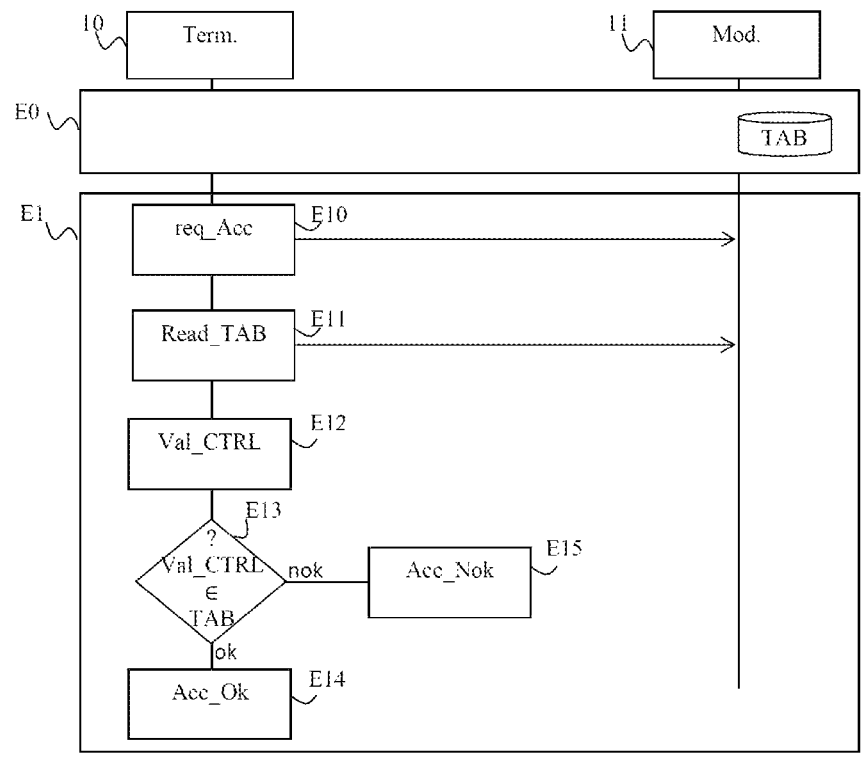
FIG. 1 shows the steps of a method for controlling access to a security module by an application of the mobile terminal, according to one exemplary embodiment.

The steps of a method for controlling access to a security module by an application of the mobile terminal, according to one exemplary embodiment, will now be described with reference to FIG. 1.

A mobile terminal 10 is equipped with an embedded or non-embedded security module 11, or (e)SIM ("(embedded) Subscriber Identity Module") of "(e)UICC" ("(embedded) Universal Integrated Circuit Card") type. The security module 11 is designed to manage operator applications that are located in the module or, in the case of an eUICC module, in a profile dedicated to an operator. The mobile terminal 10 is a consumer mobile equipment, for example a smartphone smart terminal, a tablet, etc.

In the exemplary embodiment described here, the security module is of UICC type, designed to manage applications of an operator that are located in the security module 11. In this case, the security module 11 has been issued by the operator.

The security module 11 hosts applications and confidential data manipulated by these applications. These applications contained in the security module run in a dedicated environment called "Java Card". In this context, these applications are commonly called "applets". It is this term that is used hereinafter to denote applications running in the security module.

In a preliminary phase E0 of initially configuring the security module 11, a mobile network operator (not shown in FIG. 1), responsible for the security module 11, configures a correspondence table TAB for the security module 11. The correspondence table TAB associates an applet, identified by a standardized applet identifier AID (for "Application Identifier"), with a check value associated with an application of the mobile terminal in order to indicate that the application of the mobile terminal is authorized to communicate with the applet contained in the security module 11. In other words, the correspondence table TAB comprises information that determines what applications of the mobile terminal 10 have the right to ask the security module 11.

It should be noted that an application of a mobile terminal is usually certified. Such certification makes it possible to guarantee the origin of the application to the user of the terminal when said application is installed on the mobile terminal. The certification generally hinges on trusted electronic certificates, for example public key electronic certificates in the X.509 format. X.509 certificates are assumed to be known. As a reminder, it is recalled that an X.509 certificate, assigned by a trusted authority commonly called "Certification Authority", links a public key of a public key/private key pair with a name, for example an electronic address, a DNS ("domain name system") registration, etc., and that the certificate comprises a signature of all of the fields of the certificate and calculated by way of the private key of the Certification Authority held only by this Authority. The certificate is then verified by way of the public key of the Certification Authority. It should be noted that self-signed certificates exist. In this case, the fields of the certificate are signed by way of the private key associated with a public key for which the certificate has been generated. Self-signed certificates are generally for internal use. For example, a network operator may use self-signed certificates to certify applications for mobile terminals that comprise security modules that it has issued. For example, the operator "Orange" may have a self-signed developer certificate for applications that it offers. By contrast, a certificate signed by a universally recognized Certification Authority, for example the GSMA (for "GSM Association"), may be used to certify applications provided by various operators and intended to be executed on a mobile terminal with an embedded security module comprising a plurality of profiles, each profile being specific to one of these network operators.

An entity that has developed an application for a mobile terminal and that is hereinafter called "developer", for example "Orange", attaches, to the code of the application, in what is commonly called an "envelope of the application", its own developer certificate accompanied by a verification element for this certificate, for example a digital fingerprint of all of the fields of this certificate. The envelope of the application is contained in the code of the application that runs and that is loaded by the operating system of the mobile terminal. The digital fingerprint is obtained by applying a hash function, for example SHA-1 or SHA-256 (for "Secure Hash Algorithm"), to all of the fields of the certificate as standardized for example for X.509 certificates at the IETF (for "Internet Engineering Task Force"). The presentation of the fingerprint may depend on the operating system of the terminal. In any case, if a single field of the certificate is modified, the fingerprint changes. The digital fingerprint of the certificate may then be verified by applying the same hash function to all of the fields of the certificate and by comparing the result with the fingerprint contained in the envelope of the application. In one variant embodiment, which is more lightweight in terms of implementation, the digital fingerprint is obtained by applying a hash function to the public key of the certificate.

In another exemplary embodiment, the verification element of the certificate is the signature of all of the fields of the certificate as calculated by way of the private key associated with the public key of the certificate. In one variant, the verification element is a signature of the public key of the certificate as calculated by way of the private key associated with the public key certified by the certificate.

The correspondence table TAB comprises a plurality of entries, and each entry defines a rule that is dedicated to the communication of an application of the mobile terminal with an applet contained in the security module 11. Thus, for an ith entry, the correspondence table TAB comprises an identifier $AID_i$ of an applet contained in the security module 11 in a first field, and a check value representative of an application $AP_i$ of the mobile terminal 10 that is authorized to issue an access request to the security module 11 that concerns the applet $AID_i$ in a second field. The check value contained in the second field of the ith entry in the table TAB is obtained from at least two items of information associated with the application of the mobile terminal 10. The format of the identifier of an application may vary depending on the operating system of the mobile terminal 10. It may be proprietary. For an Android operating system, an application identifier is for example in the form "com.orange.pay". For an iOS operating system, an application identifier is for example in the form "12345ABCDE.com.orange.pay", where the left-hand part "12345ABCDE" corresponds to an identifier of the developer, "Orange" for example It should be noted that these exemplary identifiers do not depend on a version of the application or on the code. Such a format makes it possible to uniquely identify an application from among all of the applications of an application provider or developer, in this case the developer, or operator, "Orange".

In one variant embodiment, the identifier of the application is in a standardized format that comprises a set of fields that together uniquely and universally identify the application. In this format, the application identifier is also independent of the code and/or of the version of the application. It should be noted that when the identifier of the application is in accordance with the standardized application identifier format, then it comprises a field that identifies the developer. The check value that comprises the fingerprint of the certificate of the developer in this case makes it possible to validate the origin and the integrity of the application from the identifier of the application by verifying that the developer field that it comprises corresponds to the developer whose certificate fingerprint is provided in the check value. It is thus not necessary to have a certificate of the application in order to check the origin and the integrity of the application.

In a first exemplary embodiment, the check value of the application $AP_i$ of the mobile terminal is obtained by concatenating the digital fingerprint of the fields of the certificate of the developer of the application with the identifier of the application. In this first exemplary embodiment, memory space is optimized. Specifically, the space in the correspondence table TAB dedicated to storing the check value is limited, which may require shortening the check value. Such shortening is performed to the detriment of security. Specifically, in this case, the risk of two check values of two different applications being the same increases. In a second exemplary embodiment, the check value of the application $AP_i$ comprises two sub-fields: a first sub-field that comprises the digital fingerprint of the certificate of the developer of the application and a second sub-field that comprises the identifier of the application. In this exemplary embodiment, security is optimized. Specifically, the risks of obtaining two identical entries in the correspondence table TAB for two different applications are reduced to a minimum. In one variant embodiment, instead of the identifier of the application, it is a hash of the identifier of the application, calculated by way of a hash function, that is used to obtain the check value of the application $AP_i$. The hash of the identifier of the application has a fixed size, which may facilitate implementation. Of course, the invention is not limited to these examples for obtaining the check value.

By associating a combination of the digital fingerprint of the certificate of the developer of the application and the identifier of the application with an applet identifier, in this case $AID_j$, of the security module 11, what the application of the mobile terminal is able to ask the security module 11 is strictly and rigorously limited. Specifically, the check value of the application $AP_i$, of the mobile terminal, which depends on the developer, is also specific to the application due to its dependence on the identifier of the application. Thus, even if a developer provides a plurality of applications to the mobile terminal, the way in which the check value associated with the application is obtained makes it possible to distinguish the applications of this developer. Moreover, the presence of the identifier of the application, which makes it possible to limit access to the security module to just this application, guarantees a certain continuity of the entry in the table upon a change of version of the application on the mobile terminal. When a new version of the application is loaded on the mobile terminal, it is not necessary to update the entry in the correspondence table TAB. Specifically, even though the code of the application of the mobile terminal has been updated, the identifier of the application remains the same. This thus avoids complex and expensive procedures for the operator of remotely updating the correspondence table TAB.

The correspondence table TAB thus created is configured by the operator on the security module 11 of the terminal 10 at the end of the configuration phase E0. This configuration is implemented by way of known secure procedures, for example by way of OTA ("over-the-air") procedures, once the security module 11 and the mobile terminal 10 have been put into circulation. In another exemplary embodiment, the correspondence table TAB in the security module 11 is configured in the factory, before the security module is put into circulation. Such a configuration is adequate for applications that are located by default on the mobile terminal when it is put into circulation; it avoids a posteriori updating by way of OTA procedures, which are expensive for the operator.

In a subsequent usage phase E1, it is assumed that a current application $AP_j$ installed on the mobile terminal 10 is executed, for example on the initiative of the user who has selected it from a menu of the terminal. It is assumed that the current application $AP_j$ is a sensitive application that needs to execute one or more applets contained in the security module 11.

In a step E10 of sending an access request, the mobile terminal 10, more precisely the operating system of the mobile 10 that is executing the code instructions of the current application $AP_j$ of the mobile terminal 10 that have been loaded into memory, sends an access request send-APDU to the security module 11. The access request send-APDU is a "send APDU" (for "Application Protocol Data Unit") command. The standardized APDU messages are messages that are normally exchanged between a security module and a module reader. The access request comprises the identifier $AID_j$ of a current applet of the security module 11 with which the current application $AP_j$ wishes to communicate. Such an access request sent to the security module 11 is subjected to access control. Specifically, it is necessary to verify that the current application $AP_j$ of the mobile terminal 10 is authorized to ask the security module 11 to execute the current applet $AID_j$ that corresponds to a sensitive functionality.

To this end, in a reading step E11, the operating system, more precisely an access control interface contained in the mobile terminal 10 and designed to verify authorizations for a mobile application to access the applets contained in the security module 11, reads the correspondence table TAB that comprises the rules for controlling access to the security module 11 and that is stored in the security module 11. As a reminder, an access control rule comprises the identifier of an applet of the security module associated with a check value for an application of the mobile terminal. The presence of the access control rule in the table TAB indicates that the application of the mobile terminal is authorized to dialog with the applet of the security module.

In a following step E12 of obtaining a current check value of the application, the operating system of the mobile terminal 10, more precisely the interface for controlling access to the security module 11 that is executed by the operating system, reads a current check value from data associated with the current application $AP_j$ of the mobile terminal that sent the access request. The current check value is contained in the envelope of the current application that is contained in the executable code of the current application. This is an information element that has been associated with the code of the application, for example by the developer of the application. In one exemplary embodiment, the current check value is the concatenation of the digital fingerprint of the fields of the certificate of the developer of the current application and of an identifier of the application, for example "com.orange.pay". In one variant embodiment, the digital fingerprint of the certificate of the developer and the identifier of the application are associated with the application as two separate values. In this case, the operating system, more precisely the interface for controlling access to the security module 11, concatenates these two items of information in order to obtain the current check value for the current application $AP_j$.

In a following search step E13, the operating system of the mobile terminal, more precisely the interface for controlling access to the security module 11, searches in the correspondence table TAB for a rule that comprises the identifier of the current applet $AID_j$ and the current check value of the application $AP_j$.

In a first case (branch "ok" in FIG. 1) in which a rule that comprises the identifier of the applet $AID_j$ associated with the current check value of the application $AP_j$, indicating that the application of the mobile terminal $AP_j$ is authorized to dialog with the applet $AID_j$ of the security module 11, is found in the table TAB, then the application $AP_j$ accesses the applet $AID_j$ in an access step E14. This access comprises executing the applet $AID_j$ in the security module 11 and sending an execution result to the current application $AP_j$ of the mobile terminal 10.

In a second case (branch "nok" in FIG. 1) in which no rule comprising the applet $AID_j$ and the current check value of the application $AP_j$ is found in the table, access is denied in an end step E15. An error code may be sent to the current application of the mobile terminal 10, and a message may be displayed for the attention of the user on an interface of the mobile terminal 10.

The correspondence table TAB is a data structure that complies with the format of a PKCS #15 file. PKCS #15 is a standard approved format used for transferring sensitive data between an application and a security module peripheral. The correspondence table is thus suitable for any type of mobile terminal.

In the exemplary embodiment described above, the check value of an application is obtained from the fingerprint of the fields of the certificate of the developer and from the identifier of the application. The invention is not limited to this example. Thus, in another exemplary embodiment, the check value is obtained from a digital fingerprint of the public key of the certificate and from the identifier of the application. This example is more lightweight in terms of implementation. In another exemplary embodiment, the check value is obtained from a signature of the fields of the certificate of the developer and from the identifier of the application. Lastly, in another exemplary embodiment, the check value is obtained from a signature of the public key of the certificate of the developer and from the identifier of the application. Taking into account the signature of the certificate or the signature of the public key of the usage certificate in the check value involves the Certification Authority.

Figure 2:
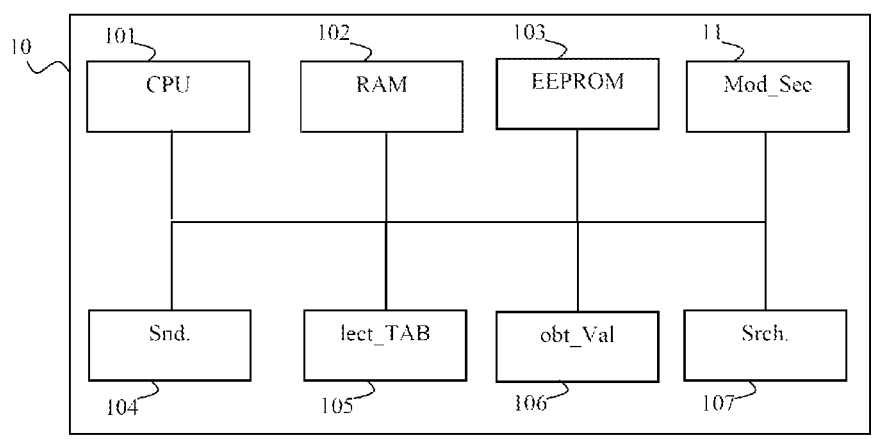
FIG. 2 is a schematic depiction of a mobile terminal able to implement the access control method, according to one exemplary embodiment of the invention.

A mobile terminal 10, designed to implement the method for controlling access of an application to the security module, according to one exemplary embodiment, will now be described with reference to FIG. 2.

The mobile terminal 10 is a consumer mobile equipment, for example a smartphone smart terminal, a tablet, etc., equipped with an e(SIM) security module 11 of (e)UICC type. The security module 11 is designed to manage operator applications that are located in the module or, in the case of an eUICC module, in a profile dedicated to an operator.

The mobile terminal 10 is a computerized equipment that conventionally comprises:

a processing unit or processor 101 or "CPU" ("central processing unit"), intended to load instructions into memory, to execute them and to perform operations;

a set of memories, including a volatile memory 102, or "RAM" (for "random access memory"), used to execute code instructions, store variables, etc., and an "EEPROM" storage memory 103 ("electrically erasable programmable read-only memory"). In particular, the storage memory 103 is designed to store an access control software module that comprises code instructions for implementing the steps of the access control method as described above. The software module forms an access interface to the security module 11 for the applications of the mobile terminal 10. More precisely, when an application of the mobile terminal 10 loaded into the memory of the mobile terminal is running and requests access to an applet of the security module 11, the operating system that executes the instructions interacts with the access control module in the guise of access interface to the security module 11.

The mobile terminal 10 also comprises:

a sending module 104, designed so that a current application of the mobile terminal sends an access request sendAPDU to the security module 11. The access request comprises the current identifier $AID_j$ of an applet contained in the security module and that the application wishes to access. The sending module 104 is designed to implement step E10 of the access control method as described above;

a reading module 105, designed so that the operating system of the mobile terminal, more precisely the access interface to the security module, reads a correspondence table TAB comprising a set of access control rules, an access control rule comprising the identifier of an applet of the security module associated with a check value for an application of the mobile terminal. The access control rule that features in the correspondence table TAB indicates that the application of the mobile terminal is authorized to access the applet of the security module. The reading module 105 is designed to implement step E11 of the access control method as described above;

an obtainment module 106, designed to obtain a current check value for the current application from at least one certificate of a developer of the current application and from an identifier of the current application that are associated with the application. The obtainment module 106 is designed to implement step E12 of the access control method as described above;

a searching module 107, designed to search in the correspondence table TAB for an access control rule comprising the current identifier of the applet associated with the current check value, the current application being authorized to access the current applet when the search is positive. The searching module 107 is designed to implement step E13 of the access control method as described above.

The sending module 104, reading module 105, obtainment module 106 and searching module are preferably software modules comprising software instructions for implementing the steps of the access control method as described above.

The invention therefore also relates to:

a computer program including instructions for implementing the access control method as described above when this program is executed by a processor of the terminal 10, a readable recording medium on which the computer program described above is recorded.

The invention claimed is:

1. A method for controlling access to a security module of a mobile terminal by an application of the mobile terminal, the method comprising:
sending, by a current application of the mobile terminal, an access request to the security module, the access request comprising a current identifier of a current applet contained in the security module,
reading, by an operating system of the mobile terminal, a correspondence table comprising a set of access control rules, each access control rule of the set of access control rules comprising an identifier of a given applet of the security module and an associated check value for a given application of the mobile terminal and indicating that the given application of the mobile terminal is authorized to communicate with the given applet of the security module,
reading a current check value for the current application obtained by concatenation of at least one certificate of a developer of the current application and an identifier of the current application that are associated with the current application, the current check value being contained in an envelope of the current application that is contained in executable code of the current application,
searching in the correspondence table for a current access control rule comprising the current identifier of the current applet and the current check value, the current application being authorized to communicate with the current applet when the search is positive.

2. The method of claim 1, wherein the current check value is obtained by concatenating a digital fingerprint of the certificate of the developer of the current application and the identifier of the current application.

3. The method of claim 1, wherein the current check value comprises a digital fingerprint of the certificate of the developer of the current application in a first field and the identifier of the current application in a second field.

4. The method of claim 1, wherein the current check value is obtained from a digital signature of the certificate of the developer of the current application and from the identifier of the current application.

5. The method of claim 1, wherein the correspondence table is a data structure in accordance with the PKCS #15 format.

6. A non-transitory computer-readable medium having stored thereon instructions which, when executed by a processor, cause the processor to implement the method of claim 1.

7. A computer comprising a processor and a memory, the memory having stored thereon instructions which when executed by the processor, cause the computer to implement the method of claim 1.

8. A mobile terminal comprising an application configured to ask to communicate with an applet of a security module of the mobile terminal, the mobile terminal configured such that:
a current application of the mobile terminal sends an access request to the security module, the access request comprising the current identifier of a current applet contained in the security module, and the operating system of the mobile terminal reads a correspondence table comprising a set of access control rules, each access control rule of the set of access control rules comprising an identifier of a given applet of the security module and an associated check value for a given application of the mobile terminal and indicating that the given application of the mobile terminal is authorized to communicate with the given applet of the security module, the mobile terminal further configured to:
read a current check value for the current application obtained by concatenation of at least one certificate of a developer of the current application and an identifier of the current application that are associated with the current application, the current check value being contained in an envelope of the current application that is contained in executable code of the current application, and
search in the correspondence table for an access control rule comprising the current identifier of the current applet and the current check value, the current application being authorized to communicate with the current applet when the search is positive.

* * * * *